US009015252B2

(12) United States Patent
Ryan et al.

(10) Patent No.: US 9,015,252 B2
(45) Date of Patent: Apr. 21, 2015

(54) METHOD AND SYSTEM FOR FORCING E-MAIL ADDRESSES INTO BLIND CARBON COPY ("BCC") TO ENFORCE PRIVACY

(75) Inventors: Corinne M. Ryan, Westford, MA (US); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 2531 days.

(21) Appl. No.: 11/459,046

(22) Filed: Jul. 21, 2006

(65) Prior Publication Data

US 2008/0021962 A1 Jan. 24, 2008

(51) Int. Cl.
*G06F 15/16* (2006.01)
*H04M 1/64* (2006.01)
*G06Q 10/10* (2012.01)

(52) U.S. Cl.
CPC ................................ *G06Q 10/107* (2013.01)

(58) Field of Classification Search
USPC .......................................................... 709/206
See application file for complete search history.

(56) References Cited

U.S. PATENT DOCUMENTS

| 6,480,884 | B1 * | 11/2002 | Saito ............................. 709/207 |
| 2002/0138583 | A1 | 9/2002 | Takayama |
| 2003/0028600 | A1 * | 2/2003 | Parker ............................ 709/206 |
| 2003/0048298 | A1 | 3/2003 | Ellendman |
| 2004/0193691 | A1 | 9/2004 | Chang |
| 2005/0081051 | A1 * | 4/2005 | Girouard et al. ............... 713/200 |
| 2005/0132066 | A1 | 6/2005 | Heilmann |
| 2005/0235041 | A1 * | 10/2005 | Salamuniccar ................ 709/206 |
| 2006/0018441 | A1 * | 1/2006 | Timmins et al. ............ 379/88.12 |
| 2006/0041624 | A1 | 2/2006 | Lyle et al. |
| 2008/0109736 | A1 * | 5/2008 | Itoh ................................ 715/752 |

\* cited by examiner

*Primary Examiner* — Phuoc Nguyen
*Assistant Examiner* — Kishin G Belani
(74) *Attorney, Agent, or Firm* — BainwoodHuang (57) ABSTRACT

A system for forcing e-mail addresses into the Bcc: field of transmitted messages in order to enforce user privacy. A user interface enables a user to indicate that their e-mail address is not to be included in a "To:" or "Cc:" field of an e-mail message from another user when the number of e-mail addresses contained in those fields exceeds a threshold size. The user's e-mail address and the associated threshold are stored for future reference when new messages are sent by the other user. Subsequently, when a new message is generated by the other user in which the number of e-mail addresses contained in the "To:" and/or "Cc:" field exceeds the threshold, then the disclosed system moves the user's e-mail address from the "To:" or "Cc:" field to the "Bcc:" field of the message before the message is transmitted to its recipients. Privacy messages may either be sent individually to specific users, or may be automatically generated as a result of a general privacy setting being indicated by the user.

21 Claims, 6 Drawing Sheets

FIG. 6

METHOD AND SYSTEM FOR FORCING E-MAIL ADDRESSES INTO BLIND CARBON COPY ("BCC") TO ENFORCE PRIVACY

FIELD OF THE INVENTION

The present invention relates generally to providing privacy in electronic mail systems ("e-mail"), and more specifically to a method and system for forcing e-mail addresses into a blind carbon-copy field or the like in order to enforce end user privacy.

BACKGROUND OF THE INVENTION

As it is generally known, electronic mail ("e-mail") has become one of the most commonly used application programs for computer users everywhere. In the most basic sense, e-mail consists of the transmission of messages over one or more communication networks. E-mail messages can include content entered by a user with a keyboard or other input device, and/or electronic files copied into or attached to the messages.

E-mail messages are stored in electronic mailboxes until their recipients fetch them. Users can check their mailboxes to determine whether they have any messages, and some e-mail systems provide alert notifications when e-mail messages are received. After reading a message, the user is allowed to delete it, store it into a virtual folder maintained within the e-mail application, store it externally to the e-mail application, for example in a local file system, forward the message to one or more other users, send a reply to the sender, or send a reply to the sender and all recipients of the message.

E-mail messages are sent to one or more recipients by specifying the recipients' names or e-mail addresses. The primary recipients for a given message are indicated in a "To:" field provided in a new message user interface. Additional recipients for a message may be indicated in a carbon copy ("Cc:") field or a blind carbon copy ("Bcc:") field also presented in the new message user interface. When a message is received and read, the e-mail addresses contained in the "To:" and "Cc:" fields are visible and accessible at the receiving system, while the addresses contained in the "Bcc:" field are not.

Existing e-mail systems often maintain or interface to a database of e-mail addresses referred to as an "address book". Address books typically associate the names of other users with their e-mail addresses, so that when a user's name is entered into a recipient field ("To:", "Cc:", "Bcc:") of a new message user interface, the system automatically looks up the e-mail address for that user and substitutes it for the user's name in the resulting message.

A problem with existing e-mail systems sometimes occurs in connection with messages having a large number of destination e-mail addresses in their "To:" and/or "Cc:" fields. Many e-mail client programs allow message recipients to easily cause all addresses listed in the "To:" and "Cc" fields of a received message to be added to their address book. For example, if the user clicks on an "Add all to list" option provided in a graphical user interface menu or the like, existing systems might copy all e-mail addresses in the "To:" and/or "Cc:" fields of the received message into the user's address book. This type of feature allows e-mail users to easily develop large address books indicating many other e-mail users. Users with such large address books can then easily send and/or forward messages to the large number of people listed in their address books, resulting in many recipients being indicated in the "To:" and/or "Cc:" fields of those messages. The recipients of those messages can again copy all the addresses from their "To:" and/or "Cc:" fields. A chain of messages generated and treated in this way can cause many user's e-mail addresses to be propagated into the address books of many users, and therefore enable many users with such large address books to indiscriminately send messages to many people. Such features and user behavior can unfortunately result in recipients being bombarded with large numbers of new and/or forwarded messages that they are not directly interested in.

This problem is exacerbated by the fact that many e-mail messages are now being propagated throughout the world that instruct their recipients to forward them to all the people they know. Such messages are often hoaxes or chain letters, and of no real value. Accordingly, the result is that users may receive large numbers of e-mail messages on an ongoing basis that are effectively a waste of computer system resources store them, and/or of user time to delete them. Corporate providers of e-mail to their employers may be particularly concerned with this problem, since the resources being wasted, such as server resources and employee time, are being paid for by the corporation, while these types of messages do not contribute to the corporation's business interests.

Existing systems include many variations of filtering for unsolicited or junk mail commonly referred to as "spam", but the type of forwarded message described above may not easily be detected by existing spam filters. For example, if a user's friend or relative entered the user's name into the "To:" field of a message along with hundreds or even thousands of other recipients, and then one or more of those recipients includes the user's name in their address book with all the other recipients name, and then sends chain letter or hoax messages to the user based on that address book entry, those messages are not likely to be detected as spam, even they are unwelcome and should be deleted without being delivered.

For the above reasons and others, it would be desirable to have a new system that provides a way for a user to prevent their e-mail address from being openly distributed in mass mailings from other users, in order to maintain the user's privacy, to prevent wasting user time deleting the unwanted messages they may receive as a result, and to preserve network and computer system resources that may be used to forward and store such unwanted messages.

SUMMARY OF THE INVENTION

To address the above described and other shortcomings of existing systems, a new method and system are disclosed for forcing e-mail addresses into the Bcc: field of transmitted messages in order to enforce user privacy. In the disclosed system, a user interface is provided that enables a user to indicate that their e-mail address is not to be included in a "To:" or "Cc:" field of an e-mail message from another user when the number of e-mail addresses contained in those fields exceeds a threshold size. In response to such an indication, the user's e-mail address and the associated threshold are stored for future reference when new messages are sent by the other user. Subsequently, when a new message is generated by the other user in which the number of e-mail addresses contained in the "To:" and/or "Cc:" field exceeds the threshold, then the disclosed system moves the user's e-mail address from the "To:" or "Cc:" field to the "Bcc:" field of the message before that message is transmitted to its recipients.

The disclosed system uses the "Bcc:" field for maintaining user privacy because the contents of the "Bcc:" field are not accessible to message recipients, and accordingly cannot be moved into personal address books and used as destinations for future messages. While the disclosed system may be embodied to move e-mail addresses from the "To:" and/or "Cc:" fields to the "Bcc:" field to provide privacy, it is not limited to using the "Bcc:" field, and any other specific e-mail message recipient field that has a contents not visible to message recipients may be used in the alternative.

In one embodiment, when sending a message, an e-mail user interface provides the option of enforcing privacy with regard to subsequent use of sender e-mail addresses by message recipients. For example, the delivery options for an individual message may enable a user to indicate that privacy is to be maintained with regard to their e-mail address by the message recipient. Additionally, the delivery options may also enable the sending user to indicate a threshold number of e-mail addresses, contained in the "To:" and/or "Cc:" fields of subsequent messages sent by the message recipient, that will cause the sending user's e-mail address to be moved from the "To:" or "Cc:" field into the "Bcc:" field. After the message generated with these options is received, the sending user's e-mail address and associated threshold are stored for future reference, for example in a privacy list or the like at the receiving client system or at a server system. When a subsequent message is generated by the receiving client system, and that message includes the previously stored e-mail address in a "To:" and/or "Cc:" field containing the threshold number or greater e-mail addresses, then the previously stored e-mail address is moved from the "To:" or "Cc:" field into the "Bcc:" field of the message. Alternatively, instead of or in addition to allowing the user to set e-mail address privacy for individual messages, the disclosed system may be embodied to allow the user to indicate a default setting of e-mail address privacy, and associated threshold, to be used for all transmitted messages.

The receiver of a privacy request message may be presented with a screen indicating that by opening the message, they agree to the sender's request that the privacy of the sender's e-mail address be maintained.

In another embodiment, an auto-response e-mail address privacy setting can be selected. After a user has selected the auto-response e-mail address privacy setting, whenever a message is received, a e-mail address privacy request message is automatically generated to the message sender that either causes the e-mail address of the privacy request message source to be privately maintained in accordance with an included threshold, or that requests that the message sender approve private maintenance of the e-mail address of the privacy request message source. This embodiment may further include user interface features that enable a user to indicate certain domains and/or individual users to which such automatically generated privacy messages are not to be automatically sent.

Thus there is a disclosed a new system that conveniently enables a user to effectively prevent their e-mail address from being openly distributed in mass mailings from other users. In this way the disclosed system helps maintain the user's privacy, prevents wasting user time deleting the unwanted messages, and preserves network and computer system resources that would otherwise be used to forward and store unwanted messages.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
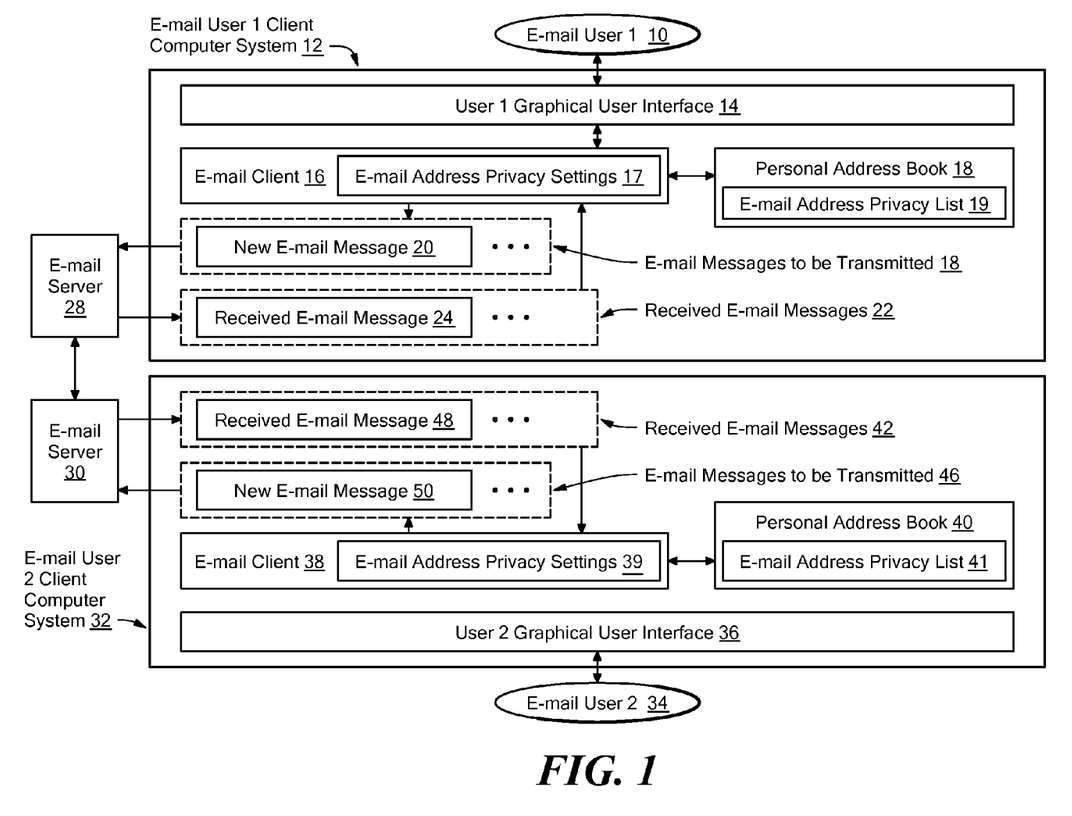
FIG. 1 is a block diagram showing components in an operational environment including an illustrative embodiment of the disclosed system.

As shown in FIG. 1, an operational environment including an illustrative embodiment of the disclosed system includes an E-mail User 1 Client Computer System 12 associated with an E-mail User 1 10, an E-mail Server 28 also associated with the E-mail User 1 10, an E-mail User 2 Client Computer System 32 associated with an E-mail User 2 34, and an E-mail Server 30 also associated with the E-mail User 2 34. The E-mail User 1 Client Computer System 12 is shown including a User 1 Graphical User Interface 14 generated by E-mail Client program code 16. The E-mail Client 16 is shown maintaining and/or having access to the E-mail Address Privacy Settings 17, and is also communicable with Personal Address Book program code 18, which is shown maintaining and/or having access to an E-mail Address Privacy List 19. The E-mail Client 16 provides the E-mail User 1 10 with access to the E-mail Messages to be Transmitted 18, as well as the Received E-mail Messages 22. For purposes of illustration, the E-mail Messages to be Transmitted 18 are shown including at least the New E-mail Message 20, and may include any newly composed message to be transmitted, and/or any response or forwarded message to be transmitted on behalf of the E-mail User 1 10. Similarly, the Received E-mail Messages 22 are shown for purposes of illustration including at least the Received E-mail Message 24, and may include any message received for the E-mail User 1 10.

The E-mail User 2 Client Computer System 32 is shown including a User 2 Graphical User Interface 36 generated by E-mail Client program code 38. The E-mail Client 38 is shown maintaining and/or having access to the E-mail Address Privacy Settings 39, and is also communicable with an Personal Address Book 40, which is shown maintaining and/or having access to an E-mail Address Privacy List 41. The E-mail Client 38 provides the E-mail User 2 34 with access to the E-mail Messages to be Transmitted 46, as well as the Received E-mail Messages 42. For purposes of illustration, the E-mail Messages to be Transmitted 46 are shown including at least the New E-mail Message 50, and may include any newly composed message to be transmitted, and/ or any response or forwarded message to be transmitted on behalf of the E-mail User 2 34. Similarly, the Received E-mail Messages 42 are shown for purposes of illustration including at least the Received E-mail Message 48, and may include any message received for the E-mail User 2 34.

During operation of an embodiment of the components shown in FIG. 1, all messages transmitted by and/or transmitted to the E-mail User 1 10 pass through the E-mail Server 28. Similarly, in such an embodiment, all messages transmitted by and/or transmitted to E-mail User 2 34 pass through the E-mail Server 30.

The E-mail Address Privacy Settings 17 indicate whether an e-mail address privacy request is to be included as part of a specific one of the E-mail Messages to be Transmitted 18, or as part of all of the E-mail Messages to be Transmitted 18. The E-mail Address Privacy Settings 17 may alternatively indicate whether an e-mail address privacy request is to be sent in an automatically generated reply message upon receipt of each of the Received E-mail Messages 22. The E-mail Address Privacy Settings 17 may further include a threshold value to be conveyed with each e-mail address privacy request, to be stored and used in receiving systems as further described below.

The Personal Address Book 18 is an address book database of e-mail addresses for use by the E-mail User 1 10. In one embodiment, the Personal Address Book 18 associates the names of other users with their e-mail addresses, so that the E-mail Client 16 can look up e-mail address for users as needed. While the Personal Address Book 18 is shown external to the E-mail Client 16, it may alternatively be embodied as part of the E-mail Client 16.

The Personal Address Book 40 is also an address book database of e-mail addresses for use by the E-mail User 2 34. In one embodiment, the Personal Address Book 40 associates the names of other users with their e-mail addresses, so that the E-mail Client 38 can look up e-mail address for users as needed. While the Personal Address Book 40 is shown external to the E-mail Client 38, it may also alternatively be embodied as part of the E-mail Client 38.

The E-mail Address Privacy List 19 indicates those E-mail addresses of other users that have sent e-mail address privacy requests to User 1 10 requesting that the privacy of their e-mail addresses be maintained. Each of the e-mail addresses in the E-mail Address Privacy List 19 may be associated with a threshold value that is also stored in the E-mail Address Privacy List 19.

The E-mail Address Privacy List 41 indicates those E-mail addresses of other users that have sent E-mail address privacy requests to User 2 34 requesting that the privacy of their E-mail addresses be maintained. Each of the E-mail addresses in the E-mail Address Privacy List 41 may be associated with a threshold value that is also stored in the E-mail Address Privacy List 41.

While the E-mail Address Privacy Settings 17 and E-mail Address Privacy List 19 are shown for purposes of illustration stored in the E-mail User 1 Client Computer System 12, the disclosed system is not so limited, and the E-mail Address Privacy Settings 17 and/or E-mail Address Privacy List 19 may alternatively be stored external to the E-mail User 1 Client Computer System 12, for example in the E-mail Server 28. Similarly, while the E-mail Address Privacy Settings 39 and E-mail Address Privacy List 41 are shown for purposes of illustration stored in the E-mail User 2 Client Computer System 32, the disclosed system is also not so limited, and the E-mail Address Privacy Settings 39 and/or E-mail Address Privacy List 41 may alternatively be stored external to the E-mail User 2 Client Computer System 32, for example in the E-mail Server 30.

In addition, those skilled in the art will recognize that any e-mail privacy settings and/or e-mail address privacy list may need to be replicated to multiple clients associated with a given user, as may be appropriate for specific embodiments of the disclosed system.

While for purposes of concise illustration only two client computer systems and two server computer systems are shown in FIG. 1, the disclosed system is not limited to any specific number of client and/or server computer systems, and may be embodied such that any specific number of client and/or server computer systems may be used.

The client computer systems 12 and 32, and server computer systems 28 and 30 of FIG. 1 are communicably connected, for example by way of one or more communication networks such as the Internet, a Local Area Network (LAN), or other specific type of communication network. The client software 16 and 38 may, for example, use a client-server approach to operating with server application software executing respectively on the server computer systems 28 and 30 to provide portions of the graphical user interfaces 14 and 36. Alternatively, the client software 16 and 38 may include Web browser program functionality operable to request and receive Web page content, including HTML (Hypertext Markup Language) code or the like, from the servers 28 and 30 respectively, and to render such Web page content in their respective user interfaces.

The client computer systems 12 and 32, and the server computer systems 28 and 30, may each include at least one processor, program storage, such as memory, for storing program code executable on the processor, and one or more input/output devices and/or interfaces, such as data communication and/or peripheral devices and/or interfaces. The client computer systems 12 and 32, and the server computer systems 28 and 30, may each further include appropriate operating system software.

The client computer systems 12 and 32 may be any specific type of computer system or other type of client electronic device. Accordingly, examples of such client systems or devices may include, but are not limited to, desktop computer systems, PDAs (Personal Digital Assistants), cell phones, tablet PCs, or any other appropriate device capable of providing e-mail functionality to a user.

Figure 2:
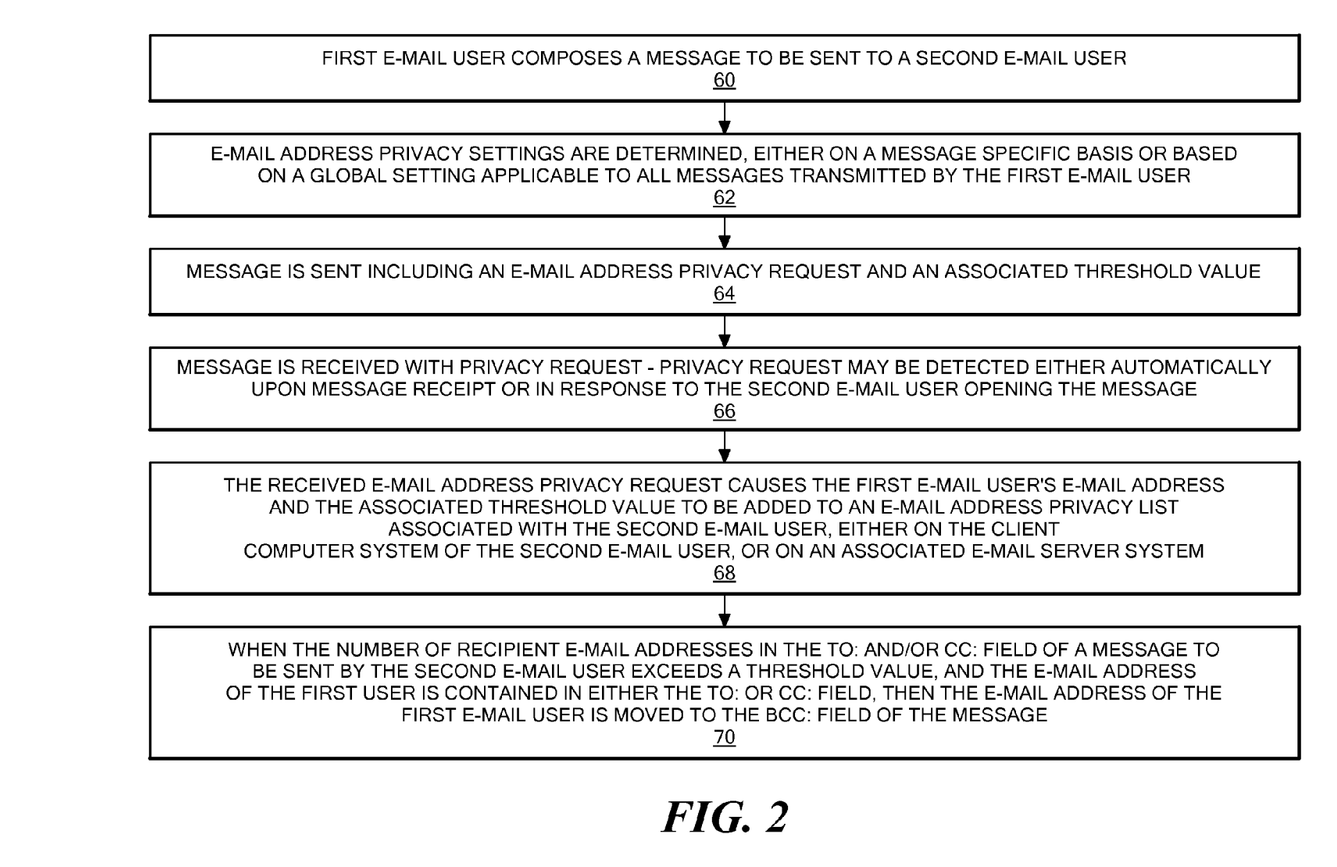
FIG. 2 is a flow chart showing steps performed in an illustrative embodiment of the disclosed system.

FIG. 2 is a flow chart showing steps performed in an illustrative embodiment of the disclosed system. As shown in FIG. 2, at step 60, a first e-mail user, such as E-mail User 1 10 of FIG. 1, composes a message to be sent to a second E-mail user, such as E-mail User 2 34 of FIG. 1. The first e-mail user may, for example, compose the message using e-mail client software, such as the E-mail Client 16, and the message itself may correspond to one of the E-mail Messages to be Transmitted 18.

At step 62, e-mail privacy settings are determined, for example by accessing the E-mail Address Privacy Settings 17. The e-mail privacy settings determined at step 62 may be single message settings that apply only to the current message to be transmitted, or may be global settings that apply to all messages transmitted by the first e-mail user. The settings determined at step 62 indicate whether the message should include an e-mail address privacy request. If an e-mail address privacy request is included with the message, then a threshold value also contained in the E-mail Address Privacy Settings 17 is also included with the message. For purposes of illustration, in the example of FIG. 2, the e-mail privacy settings determined at step 62 indicate that an e-mail address privacy request is to be included in the message composed at step 60. The e-mail address privacy request may, for example, include or be made up of a flag or flags having predetermined values and written into the message.

The determination at step 62 may be performed either by the E-mail Client 16 or by server software executing on the E-mail Server 28. For example, in an embodiment in which the E-mail Address Privacy Settings 17 are stored on the E-mail User 1 Client Computer System 12, the determination at step 62 may be performed by the E-mail Client 16. Alternatively, in an embodiment in which the E-mail Address Privacy Settings 17 include a global e-mail address privacy setting that is applicable to all messages sent by E-mail User 1 10, the E-mail Address Privacy Settings 17 may be stored on the E-mail Server 28, and the determination at step 62 may accordingly be performed by server software executing on the E-mail Server 28.

In an embodiment in which the determination at step 62 is performed by the E-mail Client 16, the flag or flags indicating the e-mail address privacy request in the message are set by the E-mail Client 16, and the threshold value is written into the message by the E-mail Client 16. Similarly, in an embodiment in which the determination at step 62 is performed by server software on the Server System 28, the flag or flags indicating the e-mail address privacy request in the message are set by the server software on the Server System 28, and the threshold value is written into the message by the server software on the Server System 28.

At step 64, the message is transmitted including the e-mail address privacy request and associated threshold value. For purposes of illustration, the message transmitted at step 64 is transmitted to a second e-mail user consisting of the E-mail User 2 34 of FIG. 1.

At step 66, the message transmitted at step 64, including the e-mail address privacy request and threshold value, is received. The e-mail address privacy request may be detected, for example, when the message is received by the E-mail Server 30, when the message is received at the E-mail User 2 Client Computer System 32 by the E-mail client 38, or when the message is read by the E-mail User 2 34.

At step 68, the received e-mail address privacy request causes the first user's e-mail address, which is the source e-mail address of the received message, to be added to an e-mail address privacy list maintained for the second e-mail user, for example the E-mail Address Privacy List 41 of E-mail User 2 34. As noted above the e-mail address privacy list may be maintained locally, for example on the E-mail User 2 Client Computer System 32, or on an associated server system, such as the E-mail Server 30. The threshold value in the received message is also stored with the source e-mail address of the received message in the e-mail address privacy list.

E-mail addresses may be added to an e-mail address privacy list in various specific ways. For example, JavaScript or the like may be used to write e-mail addresses and associated threshold values to an e-mail address privacy list. E-mail address and threshold information could also be passed to a URL (Uniform Resource Locator) of an e-mail server, as may potentially be appropriate in the context of a deployment of an embodiment of the disclosed system that is internal to a business entity or organization.

In one embodiment, detection of the e-mail address privacy request in the received message causes the E-mail Client 38 to present the E-mail User 2 34 with a dialog box, message attachment, or other user interface component through which the receiving E-mail User 2 34 may either accept or reject the request, for example by clicking on "Accept" or "Reject" graphical buttons in the dialog box, by opening the message attachment to indicate acceptance of the request, or through some other user indication. In such an embodiment, only when the receiving e-mail user accepts the request is the e-mail address of the user that sent the request added to the e-mail address privacy list.

Subsequently, as shown in step 70, when the second e-mail user sends a message, and the message has within its "To:" or "Cc:" field an e-mail address previously stored in the second e-mail user's e-mail address privacy list, and the total number of recipients entered into the "To:" and "Cc:" fields of the message is at least as large as the threshold value associated with that e-mail address in the e-mail address privacy list, then that e-mail address is moved from the "To:" or "Cc:" field into the "Bcc:" field of the message.

For example, after the e-mail address of E-mail User 10 is stored in the E-mail Address Privacy List 41, when E-mail User 2 34 attempts to send New E-mail Message 50, for example by clicking on a "Send" button object within the User 2 Graphical User Interface 36, the E-mail Client 38 determines whether the New E-mail Message 50 contains any e-mail addresses indicated by the E-mail Address Privacy List 41, such as the e-mail address of E-mail User 1 10, within the primary recipient ("To:") field and/or carbon copy ("Cc:") field of the message. If the primary recipient and/or carbon copy field of the message includes an e-mail address indicated by the E-mail Address Privacy List 41, then E-mail Client 38 determines whether the total number of e-mail addresses contained in the primary recipient field and/or carbon copy field of the message is as large as the threshold value associated with that e-mail address in the E-mail Address Privacy List 41. If the total number of e-mail address contained in the primary recipient field and/or carbon copy field of the message is as large as the threshold value associated with that e-mail address in the E-mail Address Privacy List 41, then the E-mail Client 38 moves the e-mail address, such as the e-mail address of E-mail User 1 10, from either the primary recipient field and/or carbon copy field of the message into a private recipient field, such as a blind carbon copy ("Bcc:") field of the message. For example, the e-mail address of E-mail User 1 10 is moved from the "To:" field or "Cc:" field to the "Bcc:" field within a MIME (Multipurpose Internet Mail Extensions) representation of the message either by the E-mail Client 38 before it is transmitted from the E-mail User 2 Client Computer System 32, or by server software on the E-mail Server 30 before it is transmitted from the E-mail Server 30.

Figure 3:
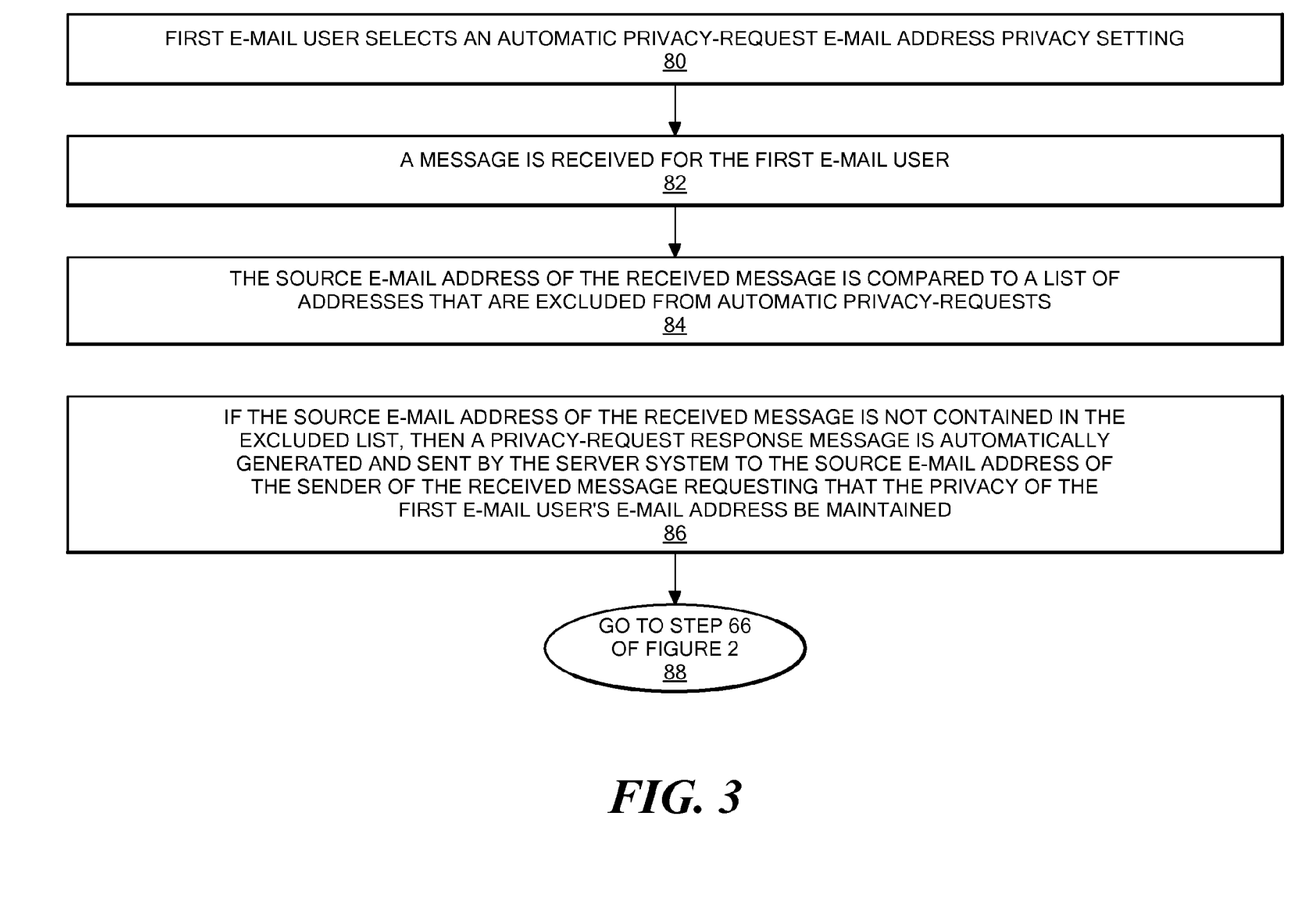
FIG. 3 is a flow chart showing steps performed in an alternative illustrative embodiment of the disclosed system.

FIG. 3 is a flow chart showing steps performed in an alternative embodiment of the disclosed system, in which an e-mail address privacy request is included as part of an automatically generated reply ("auto-response") to one or more received e-mail messages. As shown in FIG. 3, at step 80, a first e-mail user, such as E-mail User 1 10 in FIG. 1, enables automatic privacy-requests in an e-mail address privacy setting. Step 80 may, for example, be performed through the User 1 Graphical User Interface 14 or the like. A setting selected at step 80 may, for example, be stored for E-mail User 1 10 in the E-mail Address Privacy Settings 17.

At step 82, a message is received for the first e-mail user, for example the Received E-mail Message 24 shown in FIG. 1. For purposes of explanation, the Received E-mail Message 24 is received from the E-mail User 2 34. At step 84, in response to the e-mail address privacy setting selected at step 80, the e-mail address of the sender of the message received at step 82 is compared to a list of e-mail addresses that are excluded from being sent automatically generated e-mail address privacy requests. For example, the first e-mail user may have previously entered through the User 1 Graphical User Interface 14 one or more e-mail addresses or domains that are to be excluded from being sent automatic privacy requests. If the e-mail address of the sender of the message received at step 82 is found in the excluded address list accessed at step 84, then no automatic privacy-request is generated. However, if the e-mail address of the sender of the message received at step 82 is not contained in the excluded list, then at step 84 a privacy-request reply message is automatically generated and sent to the e-mail address of the sender of the message received at step 82. For example, in the steps of FIG. 3, a privacy-request reply message would be sent to the E-mail User 2 34 of FIG. 1, since in the example of FIG. 3, the Received E-mail Message 24 was received at step 82 from the E-mail User 2 34.

The privacy-request reply message generated and sent at step 86 of FIG. 3 requests that the privacy of the first e-mail user's e-mail address be maintained. The privacy-request message may, for example, include one or more flags having predetermined values indicating that privacy is being requested for the e-mail address associated with the user on whose behalf the privacy-request is automatically generated. The privacy-request message may further include a threshold value to be stored with the e-mail address of the sender in the e-mail privacy list of the receiver, in this case the E-mail Address Privacy List 41 shown in FIG. 1.

In one embodiment of the disclosed system, the privacy-request reply message generated and sent at step 86 of FIG. 3 is generated and sent by a server system that receives messages sent to the first e-mail user before the messages are obtained by the first e-mail user's client computer system. For example, in such an embodiment, the privacy-request reply message generated and sent at step 86 would be sent on behalf of E-mail User 1 10 by the E-mail Server 28 shown of FIG. 1. Moreover, the comparison of the source e-mail address of the received message with the list of excluded addresses at step 84 may also be performed at the server system. The list of excluded addresses, threshold value, and any other relevant e-mail address privacy settings would accordingly also be stored at the server system in such an embodiment.

At step 88, the processing of the received reply message including an e-mail address privacy-request and associated threshold value is the same as described above for processing of a received message including an e-mail address privacy request and associated threshold value with respect to steps 66, 68 and 70 of FIG. 1. Accordingly, upon receipt of the automatically generated reply message including the e-mail address privacy-request and associated threshold value, the receiving system adds the e-mail address of the user for whom the reply message was sent (i.e. the source e-mail address of the reply message or e-mail address contained in the "From:" field of the reply message) to the e-mail address privacy list of the user to which the reply was sent. For example, in the case where the privacy-request reply message generated and sent at step 86 was sent on behalf of E-mail User 1 10 by the E-mail Server 28 shown of FIG. 1, to the E-mail User 2 34, then the e-mail address of E-mail User 1 10 would be added to the E-mail Address Privacy List 41 associated with E-mail User 2 34.

Figure 4:
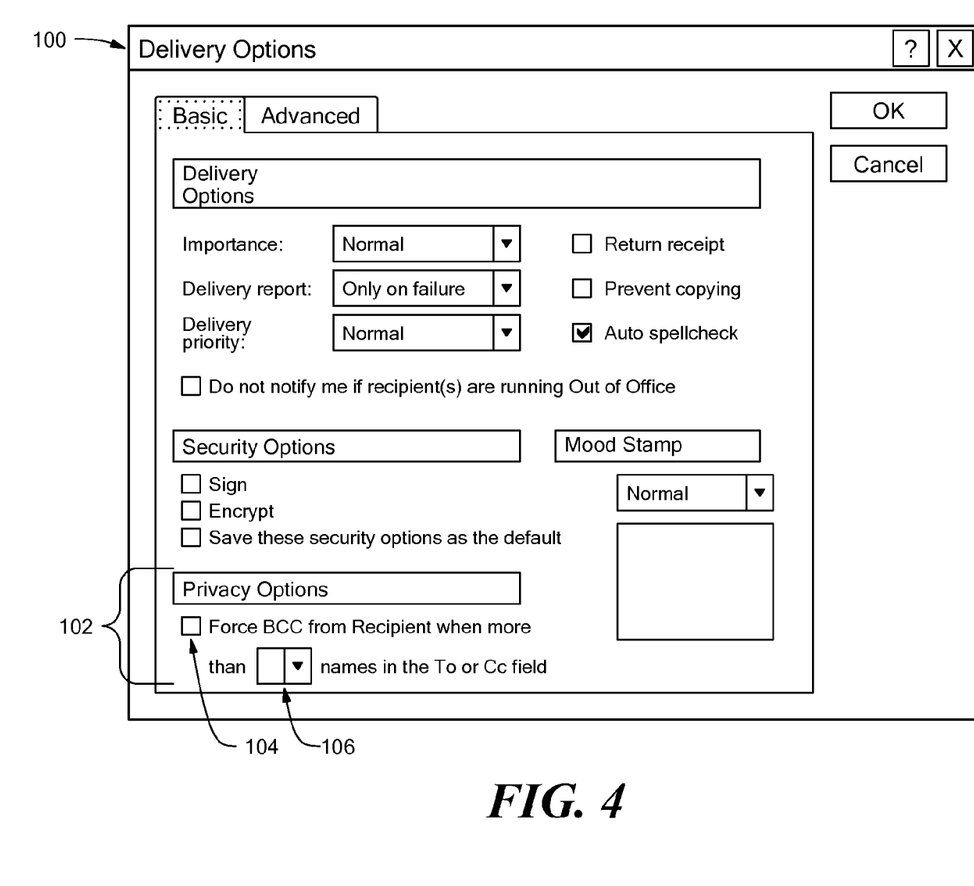
FIG. 4 is a screen shot showing a portion of a user interface provided by an illustrative embodiment of the disclosed system to enable a user to select e-mail address privacy settings for sent messages on a per-message basis, or on a global basis across all sent messages.

FIG. 4 is a screen shot showing a portion of a user interface provided by an illustrative embodiment of the disclosed system to enable a user to select e-mail address privacy settings for sent messages on a per-message basis, or on a global basis to be applied to all sent messages. As shown in FIG. 4, a Delivery Options window 100 may be accessed by a user, for example as a result of the user clicking on a corresponding menu item or button provided in an e-mail system user interface. In one embodiment, the Delivery Options window 100 enables a user to select e-mail address privacy settings to be used for a current or new message that is being composed in preparation for sending. In such an embodiment, the Delivery Options window 100 might be generated in response to the user clicking on a "Maintain Privacy" button or the like in the user interface provided to the user when the user is composing a message to be sent. Alternatively, the Delivery Options window 100 may enable the user to select e-mail address privacy settings that are to be applied to all messages that are sent by the user.

As shown in FIG. 4, the Delivery Options window 100 includes a Privacy Options section 102. The Privacy Options section 102 includes a check box 104. In a first embodiment, when the check box 104 is checked by the user, it causes the current message being composed or sent to include an e-mail address privacy request. In another embodiment, when the check box 104 is checked by the user, it causes all messages sent by the user to include an e-mail address privacy request. A pull down menu 106 enables the user to select a value for the threshold value that is also included with the e-mail privacy request(s) in either embodiment.

Figure 5:
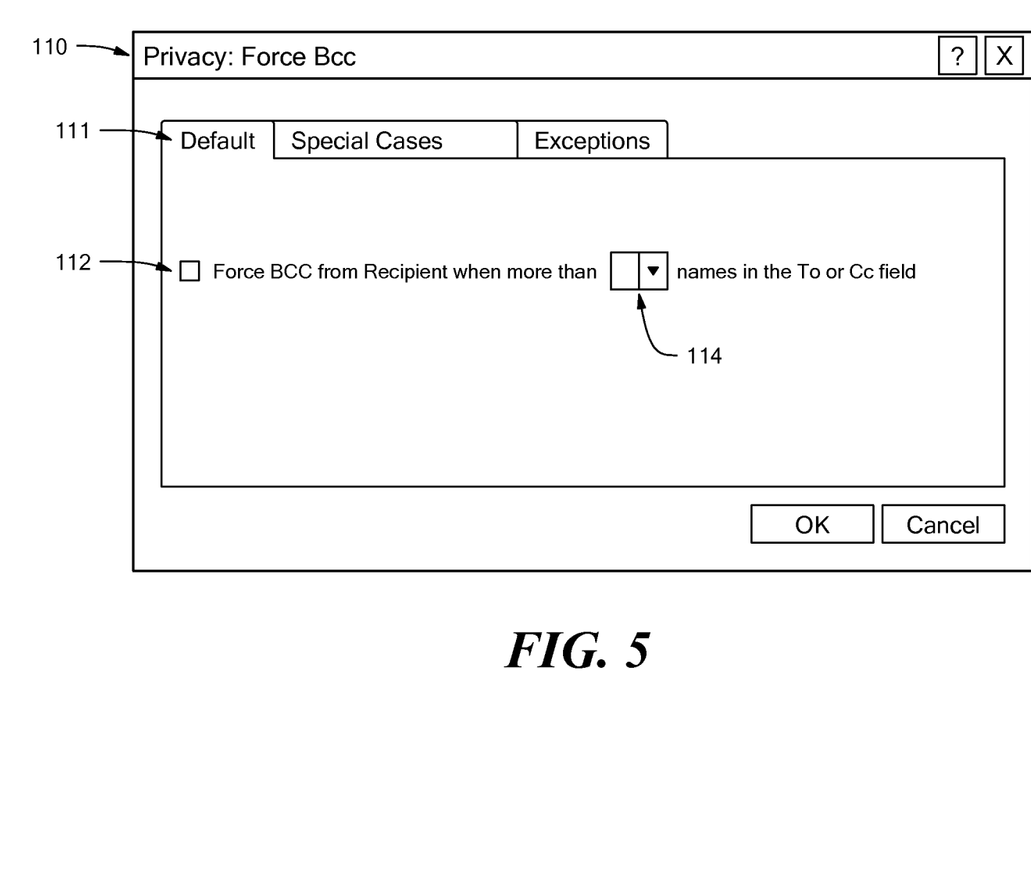
FIG. 5 is a screen shot showing a portion of a user interface provided by an illustrative embodiment of the disclosed system to enable a user to select e-mail address privacy settings for e-mail address privacy requests that are automatically generated as replies to received e-mail messages.

FIG. 5 is a screen shot showing a portion of a user interface provided by an illustrative embodiment of the disclosed system to enable a user to select e-mail address privacy settings with regard to automatic generation of e-mail address privacy request replies to all received messages. As shown in FIG. 5, a Privacy: Force Bcc window 110 may be generated as part of the e-mail system user interface for an e-mail user. The Privacy: Force Bcc window 110 is shown including a Default tab 111 having a check box 112 that allows the e-mail user to indicate that all messages received by the user are to be responded to with an automatically generated e-mail address privacy request. When the check box 112 is checked, then a pull down menu 114 enables the e-mail user to select a threshold value to be included with each message in association with the e-mail address privacy request.

Figure 6:
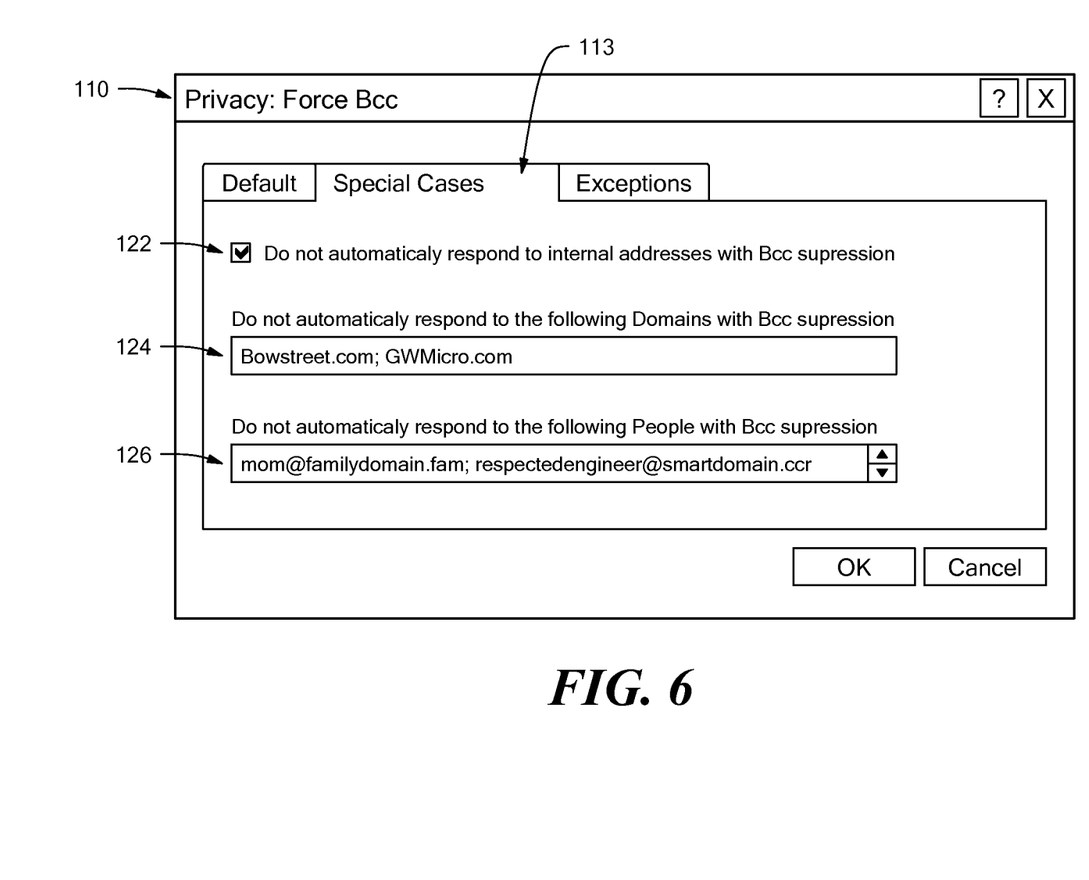
FIG. 6 is a screen shot showing another portion of a user interface provided by an illustrative embodiment of the disclosed system to enable a user to select e-mail address privacy settings for e-mail address privacy requests that are automatically generated as replies to received e-mail messages, in which the user can select one or more e-mail addresses that are to be excluded from being automatically sent e-mail address privacy requests.

FIG. 6 is another screen shot showing another portion of the user interface provided by an illustrative embodiment of the disclosed system to enable a user to select a setting for an automatic privacy request feature. As shown in FIG. 6, a Special Cases tab 113 in the Privacy: Force Bcc window 110 includes a check box 122. When the user checks the check box 122, the disclosed system excludes all internal messages from automatic generation and sending of e-mail privacy request messages, even when the automatic e-mail address privacy request feature is enabled. For example, all internal message may consist of those message received from e-mail addresses within the same domain as the user.

A field 124 enables the user to indicate specific domains from which messages are not to be automatically responded to with e-mail privacy request messages, even when the automatic e-mail address privacy request feature is enabled. Accordingly, if the user enters the domains Bowstreet.com and GWMicro.com into field 124, then receipt of e-mail messages from either of these domains (e.g. from bob@Bowstreet.com, or jeff@GWMicro.com) will not cause the disclosed system to automatically generate and send e-mail address privacy requests to the senders of such messages.

A field 126 enables the user to indicate specific e-mail addresses of people to whom automatically generated e-mail address privacy request messages are not to be sent in response to the receipt of messages from those people. Accordingly, if the e-mail addresses mom@familydomain.fam and respectedengineer@smartdomain.ccr are entered into field 126, then messages received from mom@familydomain.fam and/or respectedengineer@smartdomain.ccr will not cause the disclosed system to automatically generate and send e-mail address privacy requests to those users.

The information provided through the Special Cases tab 113 accordingly may be fed to a list of e-mail addresses that are excluded from automatic privacy-requests, and stored in the user's privacy settings or personal address book.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while specific user interface constructs are used to illustrate specific embodiments of the invention, the invention is not limited to using those specific user interface constructs, and may be embodied using any specific user interface constructs that may be appropriate for a given embodiment.

We claim:

1. A computer-implemented method of providing privacy to an electronic mail user, comprising:
    displaying, by a first computer system to said electronic mail user, a user interface object enabling said electronic mail user to indicate a threshold value, wherein said threshold value indicates a maximum number of viewable destination electronic mail addresses that may include an electronic mail address associated with said electronic mail user;
    transmitting, from said first computer system to a second computer system, a message indicating that said electronic mail user desires that said electronic mail address associated with said electronic mail user be kept private, wherein said message indicating that said electronic mail user desires that said electronic mail address associated with said electronic mail user be kept private further comprises said threshold value;
    storing, by said second computer system, responsive to receipt of said message indicating that said electronic mail user desires that said electronic mail address associated with said electronic mail user be kept private, an indication that said electronic mail user desires that said electronic mail address associated with said electronic mail user be kept private; and
    moving, by said second computer system, responsive to said indication that said electronic mail user desires that said electronic mail address associated with said electronic mail user be kept private, said electronic mail address associated with said electronic mail user from a first recipient field of an electronic mail message to a second recipient field of said electronic mail message, wherein said moving said electronic mail address associated with said electronic mail user from said first recipient field of said electronic mail message to said second recipient field of said electronic mail message is further responsive to said second computer system determining that a total number of viewable destination electronic mail addresses of said electronic mail message exceeds said threshold value.

2. The method of claim 1, wherein said first recipient field comprises a primary recipient field of said electronic mail message and said second recipient field comprises a blind carbon copy field of said electronic mail message.

3. The method of claim 1, wherein said first recipient field comprises a carbon copy field of said electronic mail message and said second recipient field comprises a blind carbon copy field of said electronic mail message.

4. The method of claim 1, further comprising:
    wherein said first recipient field comprises a primary recipient field of said electronic mail message;
    wherein said total number of viewable destination electronic mail addresses comprises a combined total number of electronic mail addresses in said first recipient field and in a carbon copy field of said electronic mail message.

5. The method of claim 1, wherein said message indicating that said electronic mail user desires that said electronic mail address associated with said electronic mail user be kept private comprises a message explicitly sent by said electronic mail user.

6. The method of claim 1, wherein said message indicating that said electronic mail user desires that said electronic mail address associated with said electronic mail user be kept private is automatically generated in response to a received message, and transmitted to a sending user for said received message.

7. The method of claim 6, further comprising:
    providing a user interface that enables said electronic mail user to indicate at least one electronic mail address to which said message indicating that said electronic mail user desires that said electronic mail address associated with said electronic mail user be kept private is not to be sent.

8. The method of claim 7, wherein said user interface that enables said electronic mail user to indicate at least one electronic mail address to which said message indicating that said electronic mail user desires that said electronic mail address associated with said electronic mail user be kept private is not to be sent further enables said electronic mail user to indicate a domain of electronic mail addresses to which said message indicating that said electronic mail user desires that said electronic mail address associated with said electronic mail user be kept private is not to be sent.

9. The method of claim 1, wherein said second computer system comprises a client system.

10. The method of claim 1, wherein said second computer system comprises a server system.

11. A system including at least one non-transitory computer readable medium, said at least one computer readable medium having program code stored thereon for providing privacy to an electronic mail user, said program code comprising:
   program code for displaying, by a first computer system to said electronic mail user, a user interface object enabling said electronic mail user to indicate a threshold value, wherein said threshold value indicates a maximum number of viewable destination electronic mail addresses that may include an electronic mail address associated with said electronic mail user;
   program code for transmitting, from said first computer system to a second computer system, a message indicating that said electronic mail user desires that said electronic mail address associated with said electronic mail user be kept private, wherein said message indicating that said electronic mail user desires that said electronic mail address associated with said electronic mail user be kept private further comprises said threshold value;
   program code for storing, by said second computer system, responsive to receipt of said message indicating that said electronic mail user desires that said electronic mail address associated with said electronic mail user be kept private, an indication that said electronic mail user desires that said electronic mail address associated with said electronic mail user be kept private; and
   program code for moving, by said second computer system, responsive to said indication that said electronic mail user desires that said electronic mail address associated with said electronic mail user be kept private, said electronic mail address associated with said electronic mail user from a first recipient field of an electronic mail message to a second recipient field of said electronic mail message, wherein said moving said electronic mail address associated with said electronic mail user from said first recipient field of said electronic mail message to said second recipient field of said electronic mail message is further responsive to said second computer system determining that a total number of viewable destination electronic mail addresses of said electronic mail message exceeds said threshold value.

12. The system of claim 11, wherein said first recipient field comprises a primary recipient field of said electronic mail message and said second recipient field comprises a blind carbon copy field of said electronic mail message.

13. The system of claim 11, wherein said first recipient field comprises a carbon copy field of said electronic mail message and said second recipient field comprises a blind carbon copy field of said electronic mail message.

14. The system of claim 11, further comprising:
   wherein said first recipient field comprises a primary recipient field of said electronic mail message;
   wherein said total number of viewable destination electronic mail addresses comprises a combined total number of electronic mail addresses in said first recipient field and in a carbon copy field of said electronic mail message.

15. The system of claim 11, wherein said message indicating that said electronic mail user desires that said electronic mail address associated with said electronic mail user be kept private comprises a message explicitly sent by said electronic mail user.

16. The system of claim 11, wherein said message indicating that said electronic mail user desires that said electronic mail address associated with said electronic mail user be kept private is automatically generated in response to a received message, and transmitted to a sending user for said received message.

17. The system of claim 16, said program code further comprising:
   program code for providing a user interface that enables said electronic mail user to indicate at least one electronic mail address to which said message indicating that said electronic mail user desires that said electronic mail address associated with said electronic mail user be kept private is not to be sent.

18. The system of claim 17, wherein said user interface that enables said electronic mail user to indicate at least one electronic mail address to which said message indicating that said electronic mail user desires that said electronic mail address associated with said electronic mail user be kept private is not to be sent further enables said electronic mail user to indicate a domain of electronic mail addresses to which said message indicating that said electronic mail user desires that said electronic mail address associated with said electronic mail user be kept private is not to be sent.

19. The system of claim 11, wherein said second computer system comprises a client system.

20. The system of claim 11, wherein said second computer system comprises a server system.

21. A computer program product including a non-transitory computer readable storage medium, said computer readable storage medium having program code stored thereon for providing privacy to an electronic mail user, said program code comprising:
   program code for displaying, by a first computer system to said electronic mail user, a user interface object enabling said electronic mail user to indicate a threshold value, wherein said threshold value indicates a maximum number of viewable destination electronic mail addresses that may include an electronic mail address associated with said electronic mail user;
   program code for transmitting, from said first computer system to a second computer system, a message indicating that said electronic mail user desires that said electronic mail address associated with said electronic mail user be kept private, wherein said message indicating that said electronic mail user desires that said electronic mail address associated with said electronic mail user be kept private further comprises said threshold value;
   program code for storing, by said second computer system, responsive to receipt of said message indicating that said electronic mail user desires that said electronic mail address associated with said electronic mail user be kept private, an indication that said electronic mail user desires that said electronic mail address associated with said electronic mail user be kept private; and
   program code for moving, by said second computer system, responsive to said indication that said electronic mail user desires that said electronic mail address associated with said electronic mail user be kept private, said electronic mail address associated with said electronic mail user from a first recipient field of an electronic mail message to a second recipient field of said electronic mail message, wherein said moving said electronic mail address associated with said electronic mail user from said first recipient field of said electronic mail message to said second recipient field of said electronic mail message is further responsive to said second computer system determining that a total number of viewable destination electronic mail addresses of said electronic mail message exceeds said threshold value.

\* \* \* \* \*